Patented Nov. 12, 1935

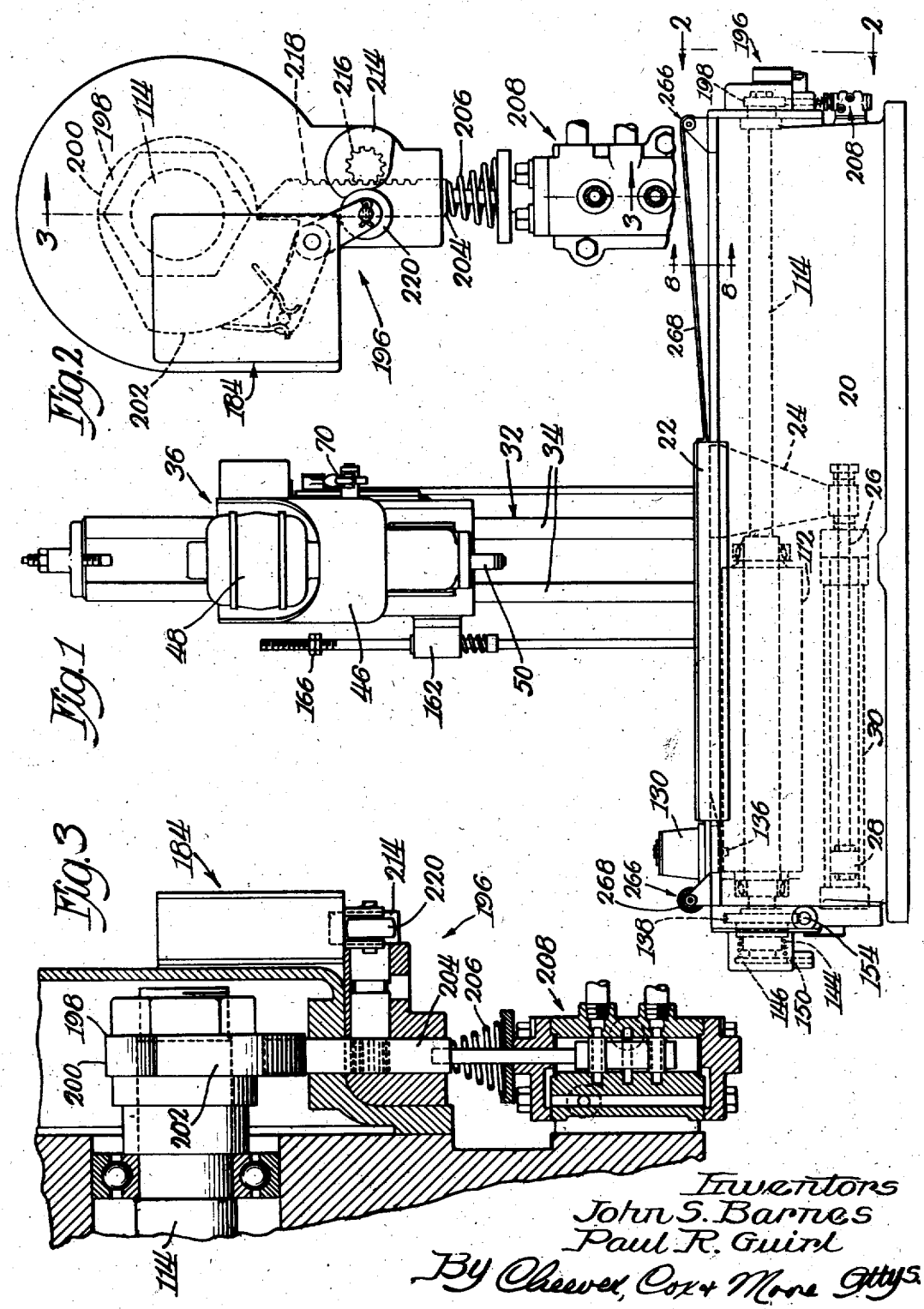

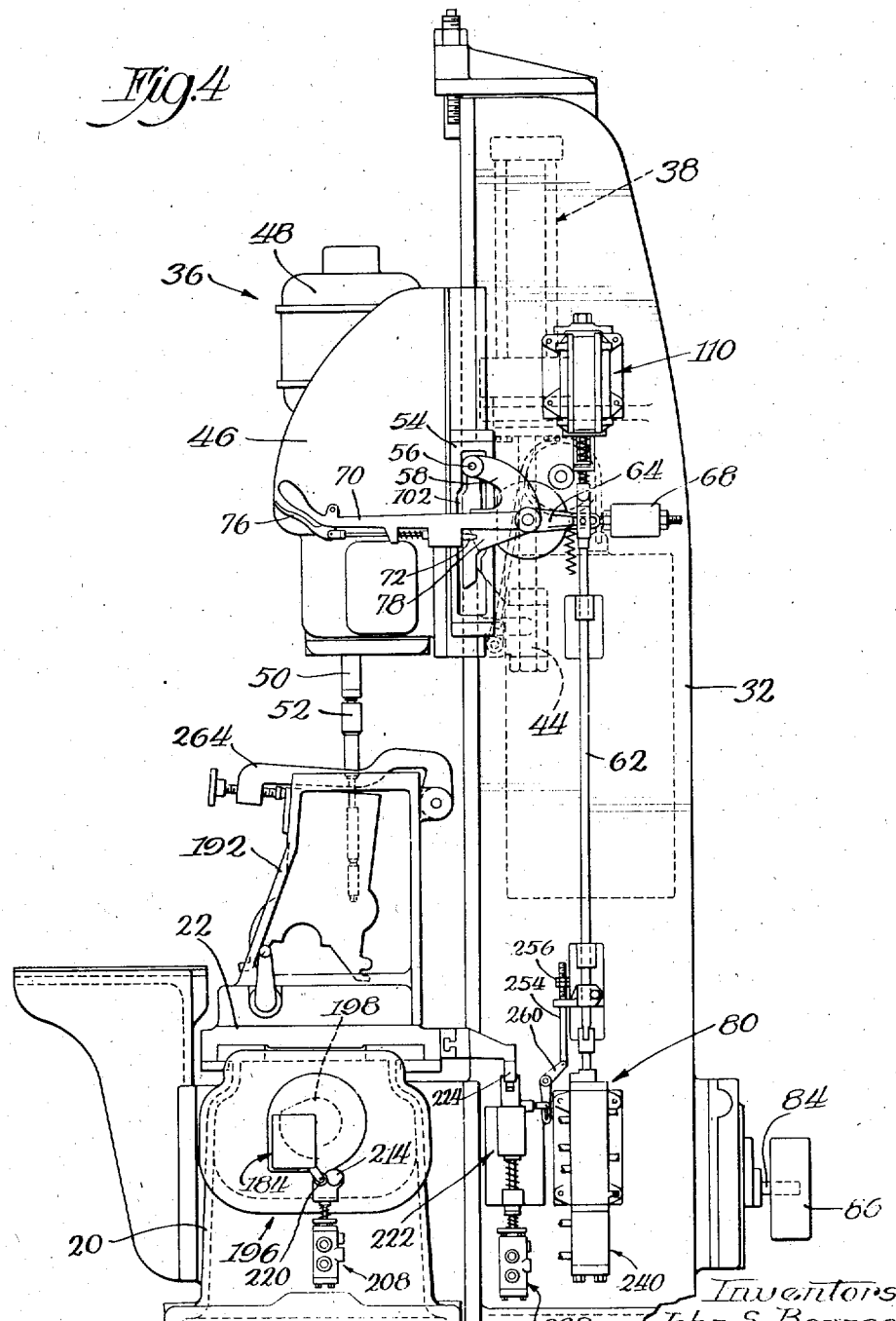

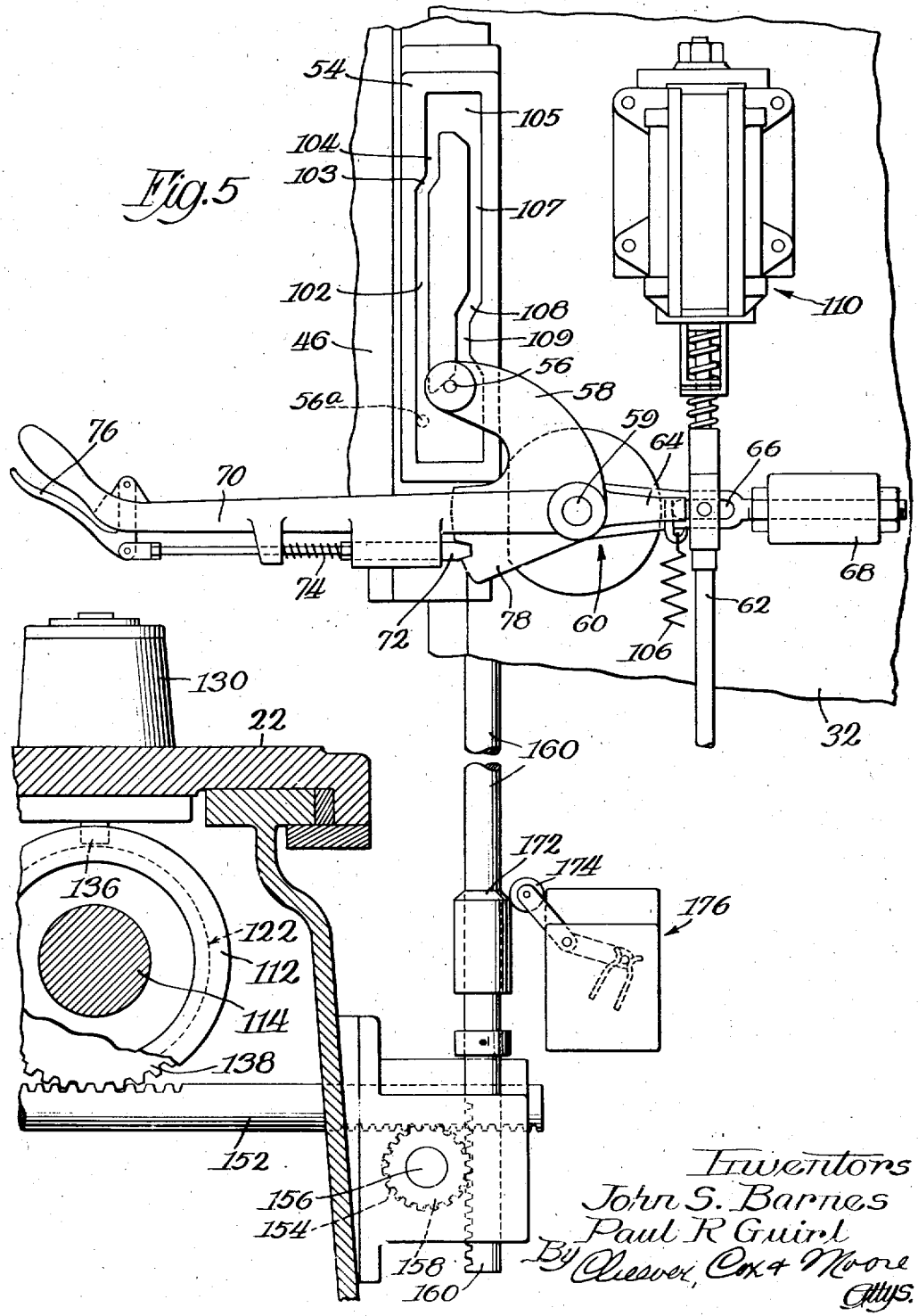

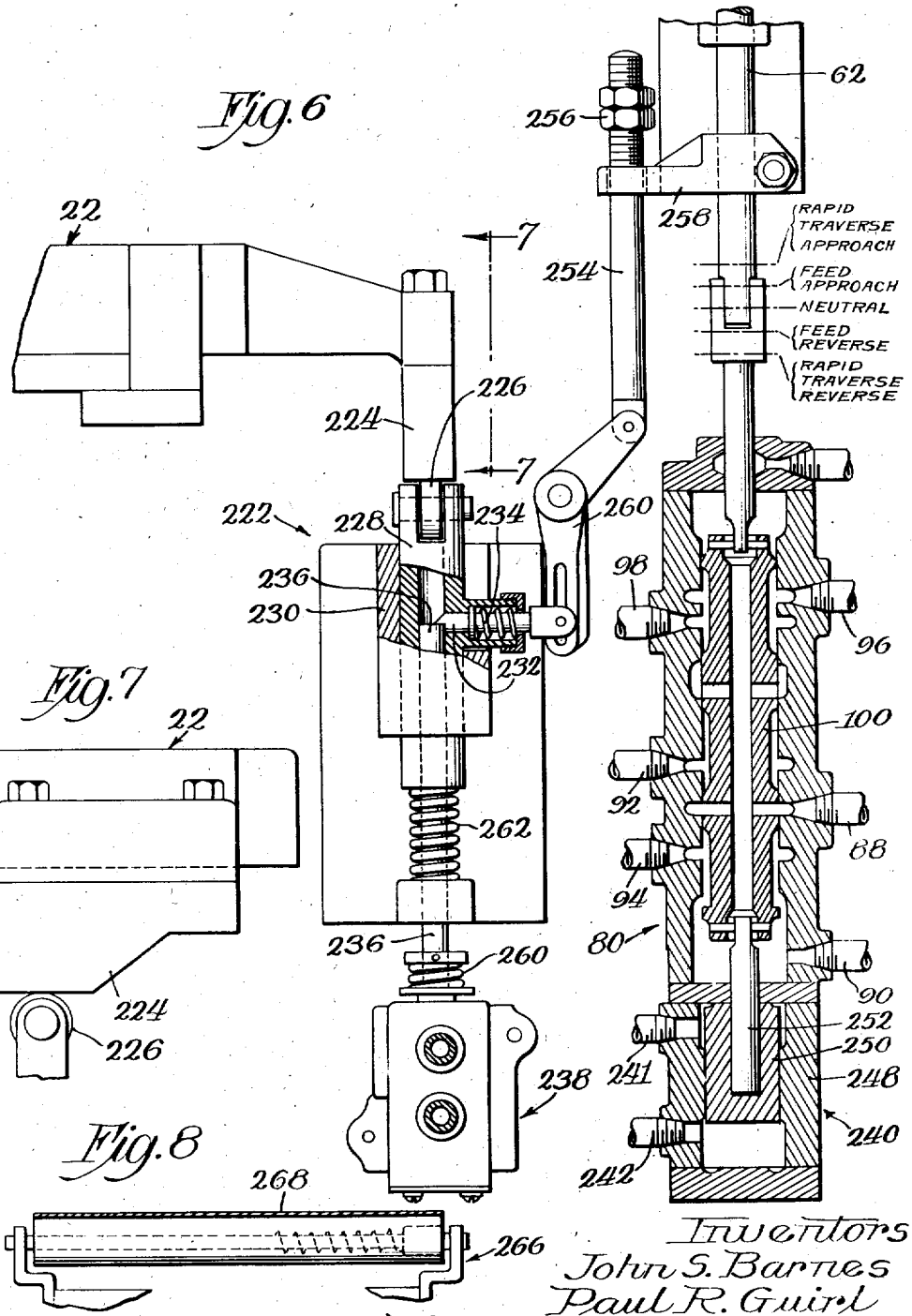

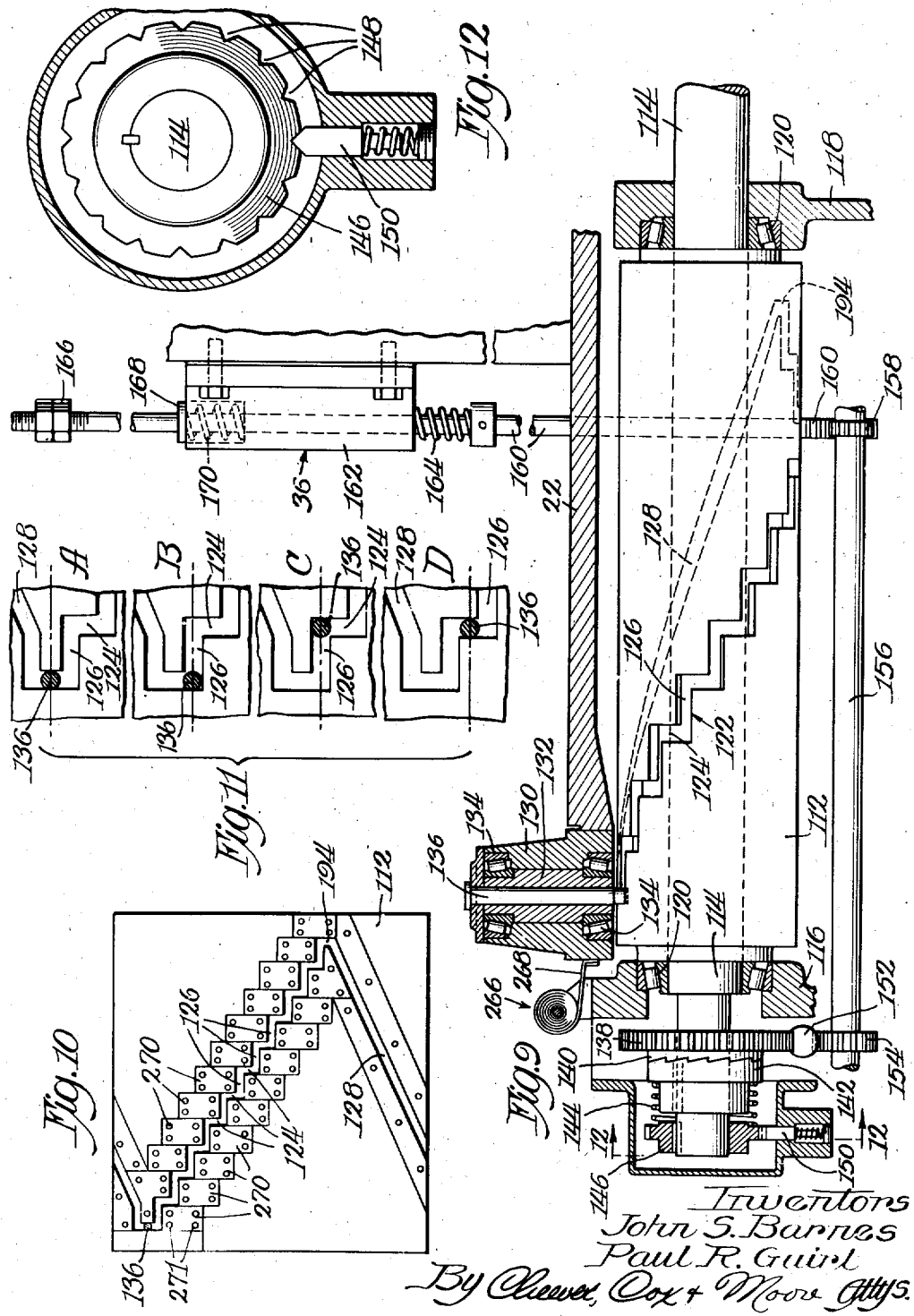

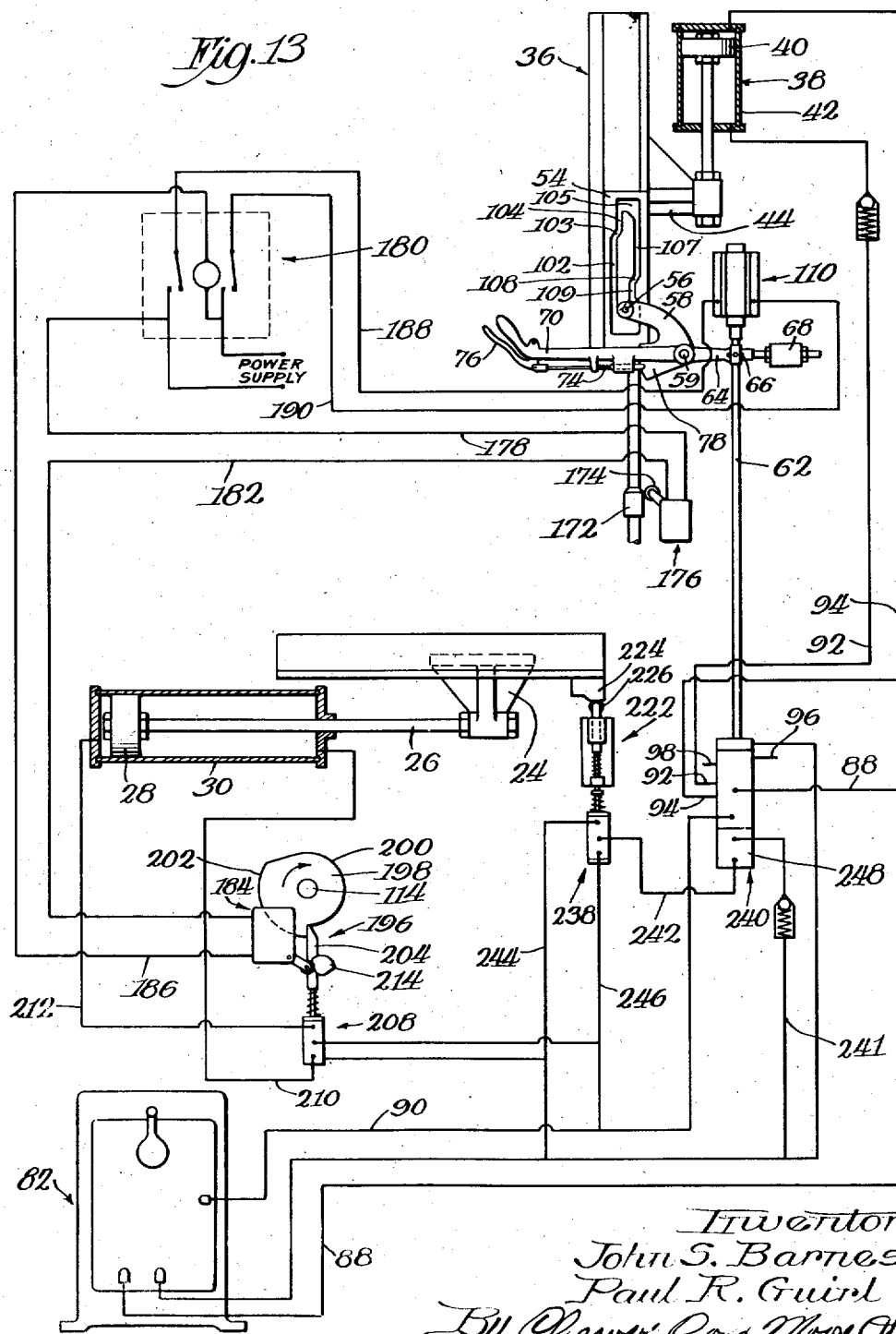

2,020,868

UNITED STATES PATENT OFFICE 2,020,868

BORING MACHINE AND THE LIKE

John S. Barnes and Paul R. Guirl, Rockford, Ill., assignors to W. F. & John Barnes Company, Rockford, Ill., a corporation of Illinois Application January 18, 1930, Serial No. 421,667

35 Claims. (Cl. 77—4)

Our invention relates generally to improvements in machine tools such as boring machines and the like and more particularly to improvements in machines whereby a successive or series of cutting operations may be performed upon the work.

The trend in the development of material working apparatus such as drilling, boring, milling and other types of machines should be toward designs which will reduce, as far as possible, the effort and skill required by an attendant in operating the machine without impairing the machining accuracy of the device. Machines which have heretofore been employed have in many instances not only required fatiguing physical exertion on the part of the operator, but have also necessitated the practice of considerable skill in order to effect the proper positioning of the work, the adjusting of various machine elements, etc. These conditions are particularly noticeable in connection with machines which are adapted to perform a series or succession of operations upon the work because in such instances it has often been necessary for the operator to perform a plurality of successive manual operations such as in starting and stopping the machine, arranging the work, making adjustments, etc.

Thus, it is one of the important objects of our present invention to provide a material working apparatus of improved practical construction by means of which the above mentioned and numerous other difficulties in shop practice which have heretofore been experienced, may be avoided. To this end we propose to provide a machine which is automatically operable to perform a series of cutting operations, it being only necessary for a workman to set up the work on the machine and then by a single manipulation of a control handle, initiate the performance of the above mentioned successive cutting operations.

More specifically, our invention contemplates the provision of a machine in which the work may be set up on a carriage or table which is adapted for intermittent linear movement, a cutting tool being designed to be automatically and successively moved into and out of operative engagement with the supported work, the intermittent shifting of the work on the carriage being controlled in timed relation with respect to the movement of the tool.

Another object is to provide a machine of improved automatic design in which a series of cutting operations may be performed on the work by a tool which is shiftable toward and away from said work, said operations being performed with absolute accuracy and with a minimum amount of skill and effort on the part of the operator.

Still another object of our invention is to provide in combination with a movable work support and shiftable tool carriage, an efficiently operable hydraulic control which will serve to automatically govern the intermittent shifting of the work and the movement of the tool toward and away from the work.

Still more specifically, one of the objects of our invention is to provide an improved cam mechanism for controlling the intermittent movement of the work supporting table in such a manner as to accurately and positively position the work so as to be operatively engaged by a rotary tool which is movable vertically with respect to the table.

Another object is to provide a machine as above set forth which is adapted to be equipped with a variable displacement fluid pumping mechanism, said machine having means for supporting a rotatable cutting tool which is adapted to be hydraulically reciprocated, and a work supporting table which is adapted to be intermittently and hydraulically moved in a linear direction transversely of the reciprocable tool support.

These and numerous other objects and advantages will be more apparent from the following detailed description when considered in connection with the accompanying drawings, wherein:

Figure 1 is a front elevational view of a machine which is representative of one embodiment of our invention;

Figure 2 is an enlarged elevational view of the mechanism for controlling the reversal of the work supporting carriage, said view being taken substantially along the line 2—2 of Figure 1;

Figure 3 is a central sectional view of the mechanism shown in Figure 2, the same being taken substantially along the line 3—3 of Figure 2, certain of the parts such as the cam for controlling the fluid reversing valve and the electric switch being shown in elevation for the purpose of more clearly disclosing the arrangement of the mechanism;

Figure 4 is an enlarged end view of the machine as viewed from the right of Figure 1, the machine as shown in Figure 4, having a work piece mounted upon the table and the cutting tool being shown in operative association with the work;

Figure 5 is an enlarged fragmentary view of the manual control mechanism shown in Figure 4, the work table and associated parts being shown fragmentarily and in section for the purpose of more clearly disclosing the invention. In Figure 5 the tool head is shown in its neutral or starting position while in Figure 4 said head is shown in its lowermost position;

Figure 6 is an enlarged fragmentary view shown partly in section of the mechanism for automatically causing the main control valve to be shifted to its neutral position upon the completion of the advancing travel of the machine table;

Figure 7 is a fragmentary detailed elevational view of the cam and associated roller follower for operating the mechanism shown in Figure 6, said view being taken substantially along the line 7—7 of Figure 6;

Figure 8 is an enlarged fragmentary end view of the machine as viewed along the line 8—8 of Figure 1 disclosing the construction of the take-up reel for the flexible cover member;

Figure 9 is a fragmentary central vertical sectional view taken longitudinally of the work supporting table, certain of the parts such as the indexing drum cam being shown in elevation;

Figure 10 is a diagrammatic developed view of the indexing groove in the drum cam showing arrangement of cam plates;

Figure 11 comprises four diagrammatic representations of the cam drum which disclose the successive positions of the cam groove with respect to the follower pin;

Figure 12 is an enlarged vertical sectional view taken substantially along the line 12—12 of Figure 9; and Figure 13 is a semi-diagrammatic representation of the oil circuit and the electrical circuits for automatically controlling the operation of the machine.

Referring now to the drawings more in detail wherein like numerals have been employed to designate similar parts throughout the various figures, it will be observed that one embodiment of the invention includes a suitable elongated machine frame or base 20, the upper portion of which slidably supports a work supporting table or carriage 22. This table 22 is provided with an independent bracket 24, Figures 1 and 13, which is connected at its lower extremity with a piston rod 26. The opposite extremity of the piston rod 26 carries a hydraulically operated piston 28 which is reciprocable within a cylinder 30. By means later to be described, fluid is directed into the cylinder 30 so as to effect linear movement of the carriage or table 22.

Positioned centrally and to the rear of the machine base 20 is an upwardly extending frame section 32. The front face of this frame 32 is provided with vertical guides 34 which are adapted to slidably receive a tool head or unit which is designated generally by the numeral 36. Vertical reciprocation is imparted to the unit 36 through the agency of a suitable hydraulic mechanism 38 which includes a piston 40 and a cylinder 42, Figure 13. This piston 40 is connected in any suitable manner by means of a bracket 44 to the unit 36. Fluid is supplied to the mechanism 38 by means later to be described.

The tool head or unit 36 includes a frame 46 and this frame 46 supports an electric motor 48 which drives a depending tool spindle 50. In Figure 4 the spindle 50 is shown in operative association with a boring tool 52. Supported on one side of the tool unit 36 is a cam member 54 which is designed to cooperate with a follower or pin 56 carried at one extremity of an arm 58. This arm 58 is loosely mounted upon a shaft 59 carried by the machine frame 32. A lever mechanism 60 operates a vertically disposed valve rod 62, Figures 4, 5, and 13. The lever mechanism 60 includes a rearwardly extending arm 64 which has a slotted connection 66 with the upper portion of the valve rod 62, an adjustable weight 68 being provided to counterbalance the weight of a manually operable control lever 70 which also forms a part of the lever mechanism 60.

This control lever 70 carries a locking member 72 which is retractable against the action of a spring 74 by means of a manually operable lever 76. This locking member is adapted to interlock with a section 78 which is formed integral with the arm 58 so as to enable said arm to be manually operated by and movable as a unit with the control lever or handle 70. When the control lever 70 occupies the horizontal position shown in Figures 5 and 13 and the tool head or unit occupies its uppermost position as shown in said figures, the cam follower or pin 56 occupies a position which will be hereinafter referred to as the neutral position. When the cam follower occupies this neutral position, the position of the valve rod 62 is such as to cause a main valve unit 80, about to be described, to occupy a neutral position, see Figures 4, 6, and 13.

This main valve unit 80 forms a part of the fluid or oil circuit which controls the reciprocation of the work supporting table 22 and the tool head or unit 36 and is connected to a conventional variable displacement pump mechanism shown diagrammatically and designated generally by the numeral 82 in Figure 13. This variable displacement pump mechanism is a commercial article known as "Oil-gear" and is manufactured by The Oil Gear Co. of Milwaukee, Wisconsin, and inasmuch as the specific structural arrangement of this pump forms no part of the present invention, except as it enters into the general combination of the machine elements, a detailed illustration and description thereof is not believed to be necessary for a thorough understanding of our present invention. For a more detailed description of this pumping mechanism and control elements associated therewith, reference is made to the copending application of Ernest J. Svenson, Serial No. 391,130, filed September 9, 1929. It will be sufficient for our purpose to state that this variable displacement pump is suitably mounted within the lower portion of the upright machine frame section 32 and is connected to a drive shaft 84, Figure 4, which carries a driving pulley 86. High pressure fluid from the pump mechanism 82 passes through the piping 88, Figures 6 and 13, while low pressure fluid passes through the pipe line 90. Pipes 92 and 94 connect the main valve 80 with the hydraulic mechanism 38 which controls the vertical reciprocation of the tool unit 36. The pipe 96 is also connected to the high pressure side of the pump 82 for purposes of control while the pipe 98 serves as a return line.

With the foregoing description in mind it will be apparent that if the control handle 70 is swung downwardly when the member 72 interlocks with the section 78 formed integral with the arm 58, the valve rod 62 will be raised and this will shift the valve member 100 of the main valve unit 80 upwardly to its rapid traverse position as indicated by the transverse dot and dash lines in Figure 6. Simultaneously the cam follower 56 will be moved to the dotted position designated as 56a, Figure 5. Fluid from the pipe 94 will be directed into the cylinder 42 and thereby cause the tool unit to be rapidly moved downwardly. During the initial portion of this downward movement, the follower 56 will be positioned within the vertical cam groove 102, Figure 5, so as to maintain the rapid traverse position of the main valve 100. When the follower 56 reaches the groove section 103, said follower will experience a movement to the right which will be sufficient to cause the valve 100 to be shifted downwardly to its feed position. The tool head will then experience a downward movement at a feeding rate and the cam follower will be positioned within the section 104 of the cam member. When the cam member 54 has been lowered to the position at which the cam follower 56 is positioned within the section 105 of the cam groove, said follower will experience a sudden movement to the right in response to the action of a coil spring 106, thereby causing the main valve 100 to be shifted to its reverse rapid traverse position. This will cause the tool head or unit to be moved upwardly at a rapid rate and the cam follower will be positioned in the groove section 107. When the groove section 108 is reached, the cam follower will be swung to the left sufficiently to cause the valve to be raised to its feed reverse position. This will cause the tool head to be moved upwardly at a feeding rate and the cam follower will be positioned within the groove section 109. As the cam 54 approaches the limit of its upward movement, electrical means in the form of a solenoid 110 is energized so as to exert an upward pull on the valve rod 62. This will cause the automatic shifting of the cam follower 56 from the groove 109 past the neutral position shown by solid lines in Figure 5 to the rapid approach position designated by the numeral 56a in Figure 5. In this manner another cycle of operation is automatically initiated and the tool head or unit will experience another complete reciprocation similar to the movement just described.

The electrical circuits for controlling the operation of the solenoid 110 will be later set forth in detail. It will be apparent that if complete manual control of the valve unit 80 is desired, it is only necessary to retract the locking member 72 by actuating the lever 76, thereby disconnecting the cam follower arm 58 from the lever mechanism 60.

Having described the mechanism for effecting the reciprocation of the tool head 36, we will now proceed to describe the mechanism for causing the tool supporting table or carriage 22 to be intermittently moved in timed relation with respect to the reciprocation of the tool head. The mechanism for controlling this intermittent movement of the work carriage includes an indexing means or cam drum 112 (see Figures 9 to 12 inclusive and Figure 5). This cam drum 112 is rotatable with a shaft 114 which is mounted by suitable spaced supports 116 and 118 within the machine base 20. To render the cam drum readily rotatable within the supports, anti-friction roller bearings 120 are provided. The cam drum 112 is provided with a cam groove designated generally by the numeral 122 and this cam groove includes a plurality of step sections, each step section including a circumferential section 124 and a longitudinally extending groove section 126. Connected between the opposite extremities of these step sections is a helical groove section 128. One extremity of the work supporting carriage 22 supports a cylindrical upright frame 130 which provides a mounting for a rotatable sleeve 132, the opposite extremities of this sleeve 132 being rotatable within suitable anti-friction roller bearings 134. This sleeve 132 carries a central cam follower pin or member 136, the lower extremity of which projects into the cam groove 122. It will be noted that the diameter of the follower pin 136 is substantially equal to the width of the cam groove. The pin 136 may be readily removed from the top to effect the disengagement thereof from the cam groove. An indexing gear 138 to the left, Figure 9, is rotatably mounted upon the cylindrical cam supporting shaft 114. One side of this gear 138 is provided with a clutch member 140 which is adapted to operatively engage a companion clutch member 142. The clutch member 142 is constantly urged toward the clutch member 140 through the action of a suitable coil spring 144 which is interposed between the clutch member 142 and an indexing plate 146 which is keyed to the shaft 114. This indexing plate 146, Figures 9 and 12, is provided with a plurality of peripheral notches 148 which are adapted to receive a spring pressed latch member 150. The function of this indexing plate will be more apparent as the description progresses.

The indexing gear 138 is operatively connected with the tool head or unit 36 through the agency of a rack bar 152, Figures 5 and 9 which also meshes with a gear 154 carried at one extremity of the shaft 156. The opposite extremity of this shaft 156 carries a gear 158 which meshes with a vertical rack bar 160. The upper portion of the bar 160 has a slidable connection with the tool head by means of a slide bracket 162 secured to the side of said head. Upon the downward stroke of the tool head, the bracket 162 slides upon the bar 160 and as the bracket 162 is moved into engagement with a shock absorbing spring 164, a downward movement is imparted to the bar 160. The downward movement of the bar causes the indexing gear 138 to be rotated in a clockwise direction as viewed from the left of Figure 9, thereby causing the teeth of the clutch members 140 and 142 to click past each other without imparting a rotative force to the cam drum 112. As the bracket 162 is carried upwardly, it is eventually moved into engagement with a stop nut 166 which is adjustably mounted at the upper threaded end of the bar 160. Consider for example that the cam follower pin 136 is positioned as shown in Figure 11, diagram A at the time that the stop nut 166 is engaged by a collar 168 at the upper end of the bracket 162. This collar 168 is resiliently supported from beneath by a suitable coil spring 170 housed within the bracket 162, Figure 9, and sufficient resistance is offered by the spring to effect the upward movement of the bar 160 when the collar 168 initially engages the stop 166. This movement will partially rotate the cam drum 112 in a counterclockwise direction as viewed from the left of Figures 9 and 11, thereby causing the cam drum 112 to be rotated from the position shown in diagram A of Figure 11 to the position shown in diagram B. Thus the follower member 136 is positioned with respect to the cam groove so as to permit the work supporting table to be urged to the right, Figures 9 and 13, in response to the movement of the piston 28 within the cylinder 30. The movement of the table 22 is interrupted by the engagement of the follower member 136 with the side wall of the groove as shown in diagram C of Figure 11. During this linear movement of the table, the bracket 162 carried by the tool head continues to move upwardly a short distance and the spring 170 is compressed by reason of the engagement of the collar 168 with the stop 166. Therefore, when the cam groove and follower member are positioned as shown in diagram C of Figure 11, the force of the spring 170 will be sufficient to cause the cam drum to be slightly rotated to the position shown in diagram D of Figure 11. The cam drum is brought to rest at this position through the action of the indexing plate 146, Figures 9 and 12. The spring pressed latch 150 automatically engages one of the notches 148 so as to cause the cam drum to be automatically positioned as shown in diagram D of Figure 11. The shifting of the work supporting table in the manner just described enables another portion of the work supported thereby to be positioned beneath the tool 52. In other words, the table is automatically shifted to a position wherein a new metal removing operation may be performed.

As the bar 160 reaches the limit of its upward movement, a cam member 172 carried thereby, Figures 5 and 13, is moved into engagement with a roller 174 of an electric switch designated generally by the numeral 176. This switch may be of a suitable conventional type as for example those manufactured by the Cutler-Hammer Manufacturing Company of Milwaukee, Wisconsin. This switch 176 is normally open and by referring to the circuit diagram shown in Figure 13, the function of the switch will be readily apparent. One side of the switch is connected by means of a conductor 178 to one side of a source of power supply through a conventional magnetic contactor which is diagrammatically shown in Figure 13 and designated generally by the numeral 180. This magnetic contactor is also a standard product and therefore the structure thereof need not be described in detail for a clear understanding of the present invention. The other side of the switch 176 is connected by means of a conductor 182 to one side of a similar normally closed switch 184 and the opposite side of this switch 184 is connected by a conductor 186 to the opposite side of the magnetic contactor 180. Thus, if the switch 184 is closed at the time the switch 176 is automatically closed through the action of the cam 172, a circuit containing these switches will be closed which will energize the magnetic contactor so as to close a circuit containing the solenoid 110. This solenoid is electrically connected to the contactor by conductors 188 and 190. By energizing the solenoid 110, the valve rod 62 is automatically pulled upwardly so as to cause the valve 100 to be positioned in the rapid traverse approach position. Simultaneously the arm 58 which carries the cam follower 56, Figure 5, is swung downwardly so as to position said follower member in the position designated by the numeral 56a in Figure 5. In this manner the fluid system is hydraulically conditioned to repeat the cycle of operation just described wherein the tool head is first moved downwardly at a rapid approach speed to a predetermined position, at which position the tool head is automatically fed downwardly at a feeding speed until the completion of its cutting stroke. At this point the follower member 56 is swung across the groove portion 105 in the cam 54 so as to condition the fluid system for rapid reverse traverse and subsequently the tool head is moved upwardly at a feeding rate. From the foregoing it will be apparent that the cycle of operation of the tool head will be repeated in timed relation with the intermittent linear movement of the work supporting table 22. Thus, a work piece such as the block 192, shown in Figure 4, may be intermittently moved forwardly, and during each dwell, the tool 52 will be automatically moved into and out of operative engagement therewith. The successive cutting operations are continued until the cam drum has been rotated so as to bring the extremity 194 thereof, Figure 9, into association with the follower member 136. At this point the member 136 cooperates with the elongated helical section 128 of the groove 122 in automatically causing the table 122 to be returned to the starting position. In other words, the table is automatically moved to the left, Figure 9, until the cam groove and follower member occupy the position shown in diagram A of Figure 11.

In connection with the reversing of the work or fixture supporting table 22, attention is directed to a control mechanism positioned at one extremity of the machine to the right, Figure 1, which we have designated generally by the numeral 196, see also Figures 2, 3, 4, and 13. This control mechanism includes a cam 198 which is supported at one extremity of the shaft 114 and is provided with a circular lower cam surface 200 and a circular higher cam surface 202. During the intermittent movement of the cam drum 112, the lower cam surface 200 engages the upper extremity of a follower member 204 and this follower member is urged upwardly against the cam surface by means of a suitable spring 206. The lower extremity of the follower member 204 forms a stem of a valve mechanism designated generally by the numeral 208. This valve mechanism 208 is a standard 4-way pilot valve and is connected to opposite extremities of the cylinder 30, Figure 13, by means of suitable piping 210 and 212. The cam surface 200 shifts the member 204 downwardly and the surface 202 holds the member 204 stationary. Shifting the member 204 downwardly from the position shown in Figure 2, actuates the valve 208 so as to cause fluid to be delivered in a reverse direction to the cylinder 30, thereby effecting reverse movement of the table 22, to the left, Figure 9. This movement of the table causes relative movement between the follower member 136 and the helical groove section 128. When the table reaches the limit of its reversing movement the lower surface 200 of the cam 198 will be associated with the follower 204, thereby causing the valve 208 to effect delivery of fluid in a forward direction to the cylinder 30. The fluid is delivered from the oilgear pump 82 at a constant volume and is directed back to the pump again by means of bypassing if not utilized for the purpose of propelling or actuating any member.

Attention is directed to a cam 214, Figure 2, which carries a pinion 216. The pinion 216 meshes with rack teeth 218 provided on the follower member or bar 204. As the bar 204 moves downwardly, the cam 214 is rotated and actuates a roller 220 of the normally closed switch 184. Opening the switch 184 at this interval prevents the solenoid 110 from being energized. This in turn prevents the follower member 56, Figure 5, from being moved to the rapid traverse position 56a. In other words, during the reversing movement of the table there must be no downward movement of the tool head 36. Obviously, when the table 22 has reached its starting position, the cam 214 will have been moved back to the position shown in Figure 2, thereby effecting the closing of the switch 184. The timing of the cam 214 may be slightly retarded in action so as not to allow the normally closed switch 184 to be opened before the work supporting head 36 has traveled downwardly a suitable distance in response to the manual manipulation of the main control lever.

In order to effect the positive return of the main control valve 100 to its neutral position when the table has completed its cycle of operation, we provide a control mechanism which is designated generally by the numeral 222, Figures 4, 6, 7, and 13. This mechanism includes a cam block 224 which is carried upon the inner side and at one extremity of the table or carriage 22. As the table reaches the limit of its reversing movement, to the left, Figures 1 and 9, the cam block 224 is carried into engagement with a roller 226 which is mounted within the upper extremity of a sleeve 228. This sleeve 228 is reciprocably mounted within a bracket 230 secured to the side of the machine base or frame. The sleeve 228 is formed with a lateral boss for receiving a locking pin 232. A spring 234 normally urges the pin inwardly and when the pin occupies the position shown in Figure 6, the inner end thereof engages the upper end of a shaft 236. Thus, when the cam block 224 engages the roller 226, the sleeve 228 and shaft 236 move downwardly as a unit and cause a valve mechanism 238 to be actuated. The valve mechanism 238 may be a conventional three-way pilot valve and is connected with the lower end of an auxiliary valve mechanism 240 by means of a pipe line 242. Pipe lines 244 and 246 serve to connect the valve mechanism with the pipe lines 90 and 96 respectively. A return pipe line 241 connects the auxiliary valve mechanism 240 with the pipe line 96. From the foregoing it should be understood that normally, the fluid from the system circulates through the valve mechanism 238 and the connecting pipe lines 244 and 246. However, when the shaft 236 is lowered through the action of the cam block 224, the valve is conditioned to direct fluid through the pipe line 242 into a cylinder 248 of the auxiliary valve 240. Within the cylinder 248 is a piston 250 which has a connecting or piston rod 252 slidably mounted therein. The upper end of the piston rod 252 is connected to the lower end of the main control valve 100. It will thus be apparent that when a charge of fluid is introduced within the cylinder 248, the main valve 100 will be moved upwardly until the piston head 250 reaches the position shown in Figure 6. This movement is sufficient to carry the main valve 100 to its neutral position and no farther. The mechanism 222 thus serves to effect the positive, automatic return of the main valve 100 and consequently the main control lever to the starting or neutral position when the table 22 has reached the limit of its movement and after the tool head 36 has been shifted to its upper, inoperative position. In order to return the valve mechanism 238 to its normal position subsequent to the downward movement of the sleeve 228 and the shaft 236, we provide a lever mechanism, Figures 4 and 6, which includes a vertical rod 254. The upper end of this rod is threaded to receive adjustable stop nuts 256 and passes through a bracket 258 carried by the valve rod 62. The lower end of the rod 254 is pivotally connected with a bell crank 260. One arm of this bell crank is slotted to receive a pin carried at the outer end of the locking pin 232. Thus, when the valve rod 62 is moved upwardly, the bracket 258 eventually engages the stop nuts 256 and this swings the bell crank so as to move the locking pin 232 outwardly. When the inner end of the pin clears the upper end of the rod 236, a spring 260, Figure 6, moves the shaft 236 upwardly. A second spring 262 urges the sleeve 228 upwardly, thereby automatically reestablishing the engagement of the locking pin 232 with the shaft 236.

In the operation of the above described apparatus, the work piece, such as an engine block 192 which is to have a series of aligned holes formed therein, is mounted upon the table 22, and may be secured in position by means of suitable clamps 264. The table 22 will then occupy the position shown in Figures 1 and 9, and the follower member or pin 136 will occupy the position shown by the diagram A in Figure 11. After the block has been properly mounted, the motor 48 activated and rotation has been imparted to the pump driving pulley 86, the operator exerts a downward pull upon the lever 78 so as to move the follower member 56 to the rapid traverse approach position shown in Figure 5. This conditions the fluid system so as to effect the downward rapid movement of the tool head 36. When the tool 52 engages the work, the downward speed of travel is reduced to a feeding speed and when the tool reaches its lowermost position, the main valve 80 is automatically conditioned for reverse rapid traverse to reverse the movement of the head. As the tool head is being elevated, a partial rotation is imparted to the drum cam 112 so as to position the same as shown in diagram B of Figure 11. The fluid pressure on the table shifting piston 28 then causes said table to be shifted so as to carry the follower pin 136 to the position shown in diagram C in Figure 11. Upon reaching that position, the drum cam is again partially rotated to the position shown in diagram D of Figure 11. In this position the follower member positively secures the table against movement and also accurately positions said table with respect to the cutting tool 52. As the tool head reaches the limit of its upward movement, the normally open switch 176 is closed so as to complete an electrical circuit which includes the solenoid 110. Energizing this solenoid causes the valve rod 62 to be raised and consequently causes the follower member 56 which is carried by the arm 58, Figure 5, to be automatically shifted to the rapid approach position 56a. The cycle of operation of the cutting tool is thus automatically repeated. It will thus be apparent that the intermittent linear movement of the table takes place in timed relation with respect to the reciprocating movement of the cutting tool and that the work piece carried by the table is automatically shifted to successive positions beneath the cutting tool. As the table 22 reaches the limit of its intermittent advancing movement, the control mechanism 196 is actuated through the agency of the cam 198, the surface 202 of which engages the follower member 204, so as to reverse the direction of fluid delivery to the table actuating piston 28, and the cam 214 operates to open the circuit which contains the solenoid 110, thereby temporarily preventing the energizing of this solenoid. As the table 22 completes its reverse movement, the cam 224 carried thereby engages the roller 226 of the control mechanism 222 so as to cause the main valve 100 to be automatically and positively moved to its neutral position and another cycle of operation may be initiated by manually manipulating the handle 70.

In order to prevent chips and other foreign matter from coming in contact with the machine elements, we provide a spring take-up reel 266, Figures 1, 8, and 9, at each extremity of the machine frame. These take-up reels support a flexible cover 268 which is secured along its outer margin to the extremity of the table 22 as clearly shown in Figure 9. Thus, as the table moves in either direction, one of the flexible covers 268 is moved over certain of the machine elements such as the cam drum, while the other is automatically taken up by its companion reel. It is to be noted that the step or sinuously disposed portion of the drum cam groove 122 is formed by properly distributing a plurality of hardened plates 270 along the periphery of the cam drum as clearly shown in Figure 10. These plates may be secured to the drum in any suitable manner such as by means of screws 271 so as to render the same readily replaceable. It is also to be noted that surface portions of the plates 270 which receive the severest shocks as the result of the forward movement of the table are those portions which are positioned at the extreme right of the longitudinal groove sections 126, Figures 9, 10, and diagram C of Figure 11. However, the final positioning of the table with respect to the cutting tool 52 is done by the oppositely disposed cam surfaces positioned intermediate the circumferential cam sections 24 as clearly shown in diagram D of Figure 11. These surface portions do not receive sudden shocks due to the shifting of the table, but only experience the contacting of the follower member 136 during the rotary movement of the cam drum. Therefore, the arrangement of the plates 270 is such as to take up sudden shocks on the surface portions which are not used for finally positioning the follower member, and the surface portions which are used for that purpose are subjected to very little, if any, wear.

The invention is particularly adaptable for use with variable displacement fluid pumps and while we have disclosed a particular pumping mechanism for the purpose of illustrating the invention, it should be understood that various other fluid propelling devices may be employed with equal effectiveness without departing from the spirit and scope of our invention. Machines constructed in accordance with the teachings of our invention have proven very satisfactory in connection with drilling or boring a succession of holes in an engine block and obviously the invention is capable of numerous other practical applications. From the above description it will be apparent that minimum effort and skill on the part of the operator is required in controlling a machine which is constructed in accordance with the teachings of our invention. A single movement of the control lever by the attendant is all that is necessary to start the machine in operation and the successive cutting operations and table movements will automatically follow. The control lever is so arranged that the same may be disconnected from the arm which carries the follower member 56, Figure 5, by merely actuating the auxiliary lever 76. This disengages the locking pin 72 and enables the operator to manually control all of the movements of the machine.

Having thus described our invention, what we claim as new and desire to secure by Letters Patent is:

1. In metal working apparatus of the class described, work supporting means linearly shiftable in opposite directions, tool supporting means shiftable transversely with respect to said work supporting means, a fluid pumping mechanism, a hydraulic transmission operatively connected with said pumping mechanism for effecting movement of the work supporting means, said hydraulic transmission comprising a piston within a cylinder and operatively connected with said work supporting means, mechanism interposed between said hydraulic transmission and said pumping mechanism for effecting the reversal of said hydraulic transmission, means operable in timed relation with respect to the movement of said work supporting means for controlling the actuation of said reversing mechanism, and means for successively interrupting the movement of said work supporting means during the advancement thereof in a given direction and for securing said work support in a predetermined position during each successive dwell thereof in cooperation with said hydraulic transmission acting thereagainst.

2. In metal working apparatus of the class described, work supporting means linearly shiftable in opposite directions, tool supporting means shiftable transversely with respect to said work supporting means, a fluid pumping mechanism, a hydraulic transmission operatively connected with said pumping mechanism for effecting movement of the work supporting means, said hydraulic transmission comprising a piston within a cylinder and operatively connected with said work supporting means, mechanism interposed between said hydraulic transmission and said pumping mechanism for effecting the reversal of said hydraulic transmission, means operable in timed relation with respect to the movement of said work supporting means for controlling the actuation of said reversing mechanism, and shiftable abutment means for intermittently interrupting the movement of said work supporting means and for securing said work supporting means in a preselected position during each successive dwell thereof in cooperation with the hydraulic transmission acting thereagainst, said shiftable means being operable in response to the movement of said tool supporting means.

3. In metal working apparatus of the class described, shiftable work supporting means, tool supporting means shiftable transversely with respect to said work supporting means, a fluid pumping mechanism, a hydraulic transmission operatively connected with said pumping mechanism for effecting movement of the work supporting means, said hydraulic transmission comprising a piston within a cylinder and operatively connected with said work supporting means, mechanism interposed between said hydraulic transmission and said pumping mechanism for effecting the reversal of said hydraulic transmission, means operable in timed relation with respect to the movement of said work supporting means for controlling the actuation of said reversing mechanism, and rotary means having in association therewith a way cooperatively associated with the work supporting means for successively interrupting the movement thereof.

4. In metal working apparatus of the class described, a shiftable work supporting carriage, tool supporting means shiftable transversely with respect to said carriage, follower means operatively associated with said carriage, rotary means positioned beneath said carriage having a sinuous way for receiving and guiding said follower means to effect the successive positioning of said carriage, means operable in response to the movement of the tool supporting means for actuating said rotary means, and fluid actuated means for imparting movement to said work supporting carriage.

5. In combination with a shiftable work supporting means and a tool supporting means shiftable transversely thereof, a carriage control device including a rotary member provided with a peripheral way to enable intermittent movement of said work supporting means, axially thereof, said way being presented between a series of offset insertable hardened metallic abutment blocks adapted to withstand sudden shocks in response to the shifting movement of the work supporting means, the offsetting of said metallic blocks determining the degree of intermittent travel of the work supporting means.

6. In combination with a reciprocable carriage for supporting means and a tool supporting means shiftable transversely thereof, a rotary control device including a member having a peripheral way including portions to enable the successive positioning as said work supporting means progresses in a given direction of the carriage and other portions for arresting the movement of said carriage, and an indexing mechanism including an indexing member rotatable with said rotary control member and means cooperating with said indexing member to automatically position the rotary control member and to prevent the overrunning of said control member in response to the rotary movement imparted thereto.

7. In metal working apparatus of the class described, shiftable work supporting means, tool supporting means shiftable transversely with respect to said work supporting means, a hydraulic transmission operatively connected with said work supporting means, a hydraulic transmission operatively connected with said tool supporting means, a fluid pumping mechanism, a main fluid valve for controlling the displacement of fluid to said hydraulic transmissions, and abutment means adapted to be engaged by the structure of the work support for successively interrupting the progressive movement of said work supporting means as said work supporting means moves in a given direction and functioning in timed relation with respect to the movement of said tool supporting means, said hydraulic mechanism being connected with the work supporting means so as to urge said means against the abutment and thereby maintain a predetermined position of a supported work piece during the machining thereof.

8. In metal working apparatus of the class described, shiftable work supporting means, tool supporting means shiftable transversely with respect to the movement of said work supporting means, a hydraulic transmission operatively connected with the work supporting means, a hydraulic transmission operatively connected with said tool supporting means, a fluid pumping mechanism, a shiftable valve for controlling the displacement of fluid to said hydraulic transmissions, means for successively interrupting the movement of the work supporting means as said work supporting means is moved in a given direction, and means operable in response to the actuation of said work supporting means for automatically shifting the valve to neutral position when the work supporting means has completed a series of intermittent movements.

9. In metal working apparatus of the class described, shiftable work supporting means, tool supporting means reciprocable transversely with respect to said work supporting means, means for effecting intermittent movement of the work supporting means, fluid actuated mechanism for effecting reciprocation of the tool supporting means during successive dwells of the work supporting means, a fluid control valve operatively connected with said fluid actuated mechanism, and an electrical circuit including electrically operated means for shifting said control valve to automatically initiate the reciprocating movement of the tool supporting means, said circuit being controlled in accordance with a preselected position of said work supporting means.

10. In metal working apparatus of the class described, shiftable work supporting means, tool supporting means reciprocable transversely with respect to said work supporting means, means for effecting intermittent movement of the work supporting means, fluid actuated mechanism for effecting reciprocation of the tool supporting means during successive dwells of the work supporting means, a fluid control valve operatively connected with said fluid actuated mechanism, an electrical circuit including electrically operated means for shifting said control valve to automatically initiate the reciprocating movement of the tool supporting means, said circuit being controlled in response to the movement of said work supporting means, means for controlling the reversal of the work supporting means, and means for rendering the electrically operated means functionally inoperative during the reversal of said work supporting means.

11. In metal working apparatus of the class described, shiftable work supporting means, tool supporting means reciprocable transversely with respect to said work supporting means, means for effecting intermittent movement in a given direction to said work supporting means, fluid actuated mechanism for effecting reciprocation of the tool supporting means during successive dwells of the work supporting means, a shiftable fluid valve for controlling the displacement of fluid to said fluid actuated means, and an electrical circuit including an actuator for shifting the valve to automatically initiate each reciprocation of the tool supporting means, said circuit including a plurality of switches, one of said switches being operated in response to the movement of the work supporting means and another switch being operated in response to the movement of the tool supporting means, whereby to govern the opening and closing of the circuit in timed relation with respect to the movements of the work and tool supporting means.

12. In metal working apparatus, a shiftable work supporting means, a tool supporting means shiftable transversely with respect to the movement of said work supporting means, fluid operated mechanism for actuating said tool support, fluid actuated means progressively and intermittently shiftable in a given direction for effecting the intermittent linear movement in a given direction of said work support in timed relation with respect to the movement of said tool supporting means, means co-acting with the actuator for the work support to automatically secure the work support in a preselected position during each successive dwell thereof, a variable displacement pump, a main valve for directing fluid from said pump to said fluid operated mechanisms, and a single manually operable means for controlling the functioning of said main valve in dispatching fluid to said fluid operated mechanisms.

13. In metal working aparatus of the class described, a pair of slidable members, a fluid operated mechanism connected to one of said slidable members, a second fluid operated mechanism connected with the other slidable member, a source of fluid supply, a main valve for directing fluid to the first mentioned fluid actuated means, an auxiliary valve for directing fluid to the second fluid actuated means, a second auxiliary valve for controlling the movement of the main valve in one direction, electrically operated actuating means connected with said main valve, said main valve being operatively connected with one of said slidable members, and means for causing a reversal of fluid displacement to said second mentioned fluid actuated means.

14. In an apparatus of the class described, a pair of slidable members, fluid actuated means operatively connected with one of said members, a second fluid actuated means connected with the other slidable member, a source of fluid supply, a main valve for controlling the displacement of fluid to the first mentioned fluid actuated means, an auxiliary valve for controlling the displacement of fluid to said second mentioned fluid actuated means, a second auxiliary valve for controlling the displacement of fluid to said main valve, whereby said main valve is shifted to a neutral position, electrically controlled actuating means for successively shifting said main valve in a reverse direction, means operable in response to the movement of one of said slidable members to move the main valve in a given direction, means for temporarily rendering the electrically controlled actuating means functionally inoperative, and a manually controlled starting means for initially shifting said main valve.

15. In combination with a pumping mechanism adapted to effect a variation in the displacement of fluid, a shiftable work supporting means, a hydraulic actuator therefor, a tool supporting means shiftable transversely with respect to said work supporting means, a hydraulic actuator for said tool supporting means, a fluid circuit arrangement including a shiftable valve mechanism for controlling the delivery of fluid from said pumping mechanism to said hydraulic actuators, means including a series of adjacently positioned abutment surfaces and a member adapted for engagement therewith, said abutment surfaces and member cooperating with the first mentioned hydraulic actuator for effecting a step by step advancement of said work supporting means and for positively securing the work support in a preselected position during each successive dwell thereof, and control mechanism including a single manually operated device for controlling the timed intermittent movement of the work supporting means and the movement of said tool supporting means and for automatically arresting the movements of said work and tool supporting means at a predetermined interval to enable the replacement of a work piece on said work supporting means.

16. A machine tool including a base, a work supporting means horizontally reciprocable upon said base, a tool support positioned upon said reciprocable work support and shiftable toward and away from a work piece supported thereby, means for effecting the reciprocation of said tool support, hydraulic mechanism for shifting said work supporting means, rotary control means adapted to co-act with the structure of the shiftable work support and including a peripheral way comprising a plurality of connecting sections, certain of which extend in a direction to permit the shifting of the work support and other sections extending transversely with respect to the first mentioned sections and adapted to prevent movement of the work supporting means, means for effecting timed rotary movement of said rotary control means to intermittently position said transversely extending sections of the way for co-action with the work supporting means during the operative functioning of the reciprocable tool supporting means, and means for controlling the reciprocation of the tool supporting means in timed relation with the intermittent movement of the work supporting means.

17. In boring machines and the like, a linearly reciprocable work support, a tool support reciprocable transversely with respect to the movement of said work support, means for effecting the reciprocation of said tool support, means for automatically controlling the speed of travel of said tool support, said means being adapted to effect rapid traverse of said tool support during a predetermined interval and a slower traverse during another interval, reversible actuating means operable progressively and intermittently in a given direction for imparting step by step movement of said work support in a given direction in timed relation with respect to the movement of said tool support and for returning said work support upon the completion of the step-by-step movement thereof, abutment means for preventing the overrunning of the work support and cooperating with said reversible actuating means in effecting the step-by-step movement of the work support, and clamping means on said work support for securing the work piece in proper position to be machined.

18. In boring machines and the like, a reciprocable work support, a tool support shiftable transversely with respect to the movement of said work support, a reciprocable hydraulic actuator connected with the work support, a hydraulic actuator connected with the tool support, fluid pumping means, a shiftable valve for controlling the delivery of fluid to said hydraulic actuators, means for successively interrupting the movement of the work support as said support is moved in a given direction by said reciprocable hydraulic actuator, means for securing a work piece in position upon said work support, and means operable in response to the shifting of the work supporting means to a given position for governing the timed shifting of said control valve to a predetermined position.

19. In boring machines and the like, a machine frame, a work support reciprocably mounted on said frame, a head frame reciprocably mounted upon said machine frame and adapted for movement in a direction transverse to the movement of the work support, a rotary tool driving spindle on said head frame, power means on said head frame for driving said spindle, a hydraulic actuator for imparting movement to said head frame whereby to cause a tool carried thereby to be moved into and out of operative association with a supported work piece, a reciprocable hydraulic actuator for moving said work support in opposite directions, means for effecting the successive interruption of the movement of the work support as said support is moved in a given direction, the hydraulic actuator associated with the work support cooperating with said interrupting means to locate said work support in preselected positions relative to a supported tool, fluid pumping mechanism, means carried by the work support for securing a work piece in position thereon, and valve means automatically operable for controlling the delivery of fluid to said actuators.

20. In boring machines and the like, a machine frame, a work support reciprocably mounted on said frame, a head frame reciprocably mounted upon said machine frame and adapted for movement in a direction transverse to the movement of the work support, a rotary tool driving spindle on said head frame, power means on said head frame for driving said spindle, a hydraulic actuator for imparting movement to said head frame whereby to cause a tool carried thereby to be moved into and out of operative association with a supported work piece, a reciprocable hydraulic actuator for moving said work support in opposite directions, means for effecting the successive interruption of the movement of the work support as said support is moved in a given direction, the hydraulic actuator associated with the work support cooperating with said interrupting means to locate said work support in preselected positions relative to a supported tool, fluid pumping mechanism, means on the work support for securing a work piece in position thereon, and shiftable valve means for controlling the delivery of fluid to said actuators, said valve means being automatically shiftable upon the completion of the last movement of the work support.

21. In metal working apparatus of the class described, a reciprocable carriage for supporting and positioning a work piece, a rotary member positioned beneath said carriage having a peripheral way including a plurality of connected sections forming an undulated path along the peripheral surface of said rotary member, a follower operatively associated with the carriage and extending into said peripheral way, certain of said sections providing abutments for said follower, hydraulic means for actuating said carriage, means for successively imparting partial rotation to said rotary means to permit intermittent forward movement of said carriage, and means for supporting a tool to engage a work piece supported by said carriage.

22. In boring machines and the like, a linearly reciprocable work support, a tool support reciprocable transversely with respect to the movement of said work support, means for effecting the reciprocation of said tool support, means for automatically controlling the speed of travel of said tool support, said means being adapted to effect rapid traverse of said tool support during a predetermined interval and a slower traverse during another interval, reversible actuating means operable progressively and intermittently in a given direction for imparting step-by-step movement of said work support in a given direction in timed relation with respect to the movement of said tool support and for returning said work support upon the completion of the step-by-step movement thereof, abutment means cooperating to positively stop and position the work support during said intermittent movement, and means on said work support for securing a work piece in proper position to be machined.

23. In boring machines and the like, a linearly reciprocable work support, a tool support reciprocable transversely with respect to the movement of said work support, means for effecting the reciprocation of said tool support, means for automatically controlling the speed of travel of said tool support, said means being adapted to effect a rapid traverse of said tool support during a predetermined interval and a slower traverse during another interval, reversible actuating means including a cylinder and piston construction operable progressively and intermittently in a given direction for imparting step-by-step movement of said work support in a given direction in timed relation with respect to the movement of said tool support and for returning said work support upon the completion of the step-by-step movement thereof, a stop device including mechanical means cooperating directly with the work support for preventing the overrunning thereof and cooperating with said reversible actuating means in effecting the step-by-step movement of the work support, and means for securing a work piece on said work support in proper position to be machined.

24. In boring machines and the like, a linearly reciprocable work support, a tool support reciprocable transversely with respect to the movement of said work support, hydraulic actuator means for effecting the reciprocation of the tool support, means for automatically controlling the speed of travel of said tool support, said means being adapted to effect rapid traverse of said tool support during a predetermined interval and a slower traverse during another interval, reversible actuating means including a cylinder and piston construction operable progressively and intermittently in a given direction for imparting step-by-step movement of said work support in a given direction in timed relation with respect to the movement of said tool support and for returning said work support upon the completion of the step-by-step movement thereof, a mechanical stop device cooperating directly with the work support for preventing the over-running thereof and cooperating with said reversible actuating means in effecting the step-by-step movement of the work support, and means for securing a work piece on said work support in proper position to be machined.

25. In boring machines and the like, a linearly reciprocable work support, a tool support reciprocable transversely with respect to the movement of said work support, means for effecting reciprocation of said tool support, means for automatically controlling the speed of travel of said tool support whereby to cause rapid traverse and slower traverse to said tool support at predetermined intervals during the cycle of operation thereof, reversible actuating means operable progressively and intermittently in a given direction for imparting step-by-step movement to said work support in a given direction in timed relation with respect to the movement of said tool support and for returning said work support upon the completion of the step-by-step movement thereof, abutment means for preventing the over-running of the work support and cooperating with said reversible actuating means in effecting the step-by-step movement of the work support, and means automatically operable after the dwell of the work support at its last position for reversing said support to its starting position.

26. In a metal working apparatus, a reciprocable carriage for supporting and positioning a work piece and capable of progressive intermittent linear movement in a given direction, tool supporting means shiftable transversely with respect to the linear movement of the carriage, means including a plurality of spaced abutments adapted for successive engagement to positively interrupt the movement of the carriage in timed relation with the movement of the tool supporting means, said abutments providing successive positive stops for accurately positioning said work supporting means during each dwell thereof, and reversible actuating means for imparting linear movement to said carriage structure from a starting position into successive positions of engagement with said abutments to thereby effect a progressive intermittent linear movement and a return movement of said carriage, said reversible actuating means being operable to maintain said work support during the period of intermittent movement constantly advanced from said starting position.

27. In metal working apparatus, a reciprocable carriage for supporting and positioning a work piece and capable of progressive intermittent linear movement in a given direction, a tool supporting means shiftable transversely with respect to the linear movement of the carriage, means including a plurality of spaced abutments adapted for successive engagement to positively interrupt the movement of the carriage in timed relation with the movement of the tool supporting means, said abutments providing successive positive stops for accurately positioning said work supporting means during each dwell thereof, and reversible fluid operated mechanism for imparting linear movement to said carriage structure from a starting position into successive positions of engagement with said abutments to thereby effect a progressive intermittent linear movement and a return movement of said carriage, said reversible fluid operated mechanism being operable to maintain said work support during the period of intermittent movement constantly advanced from said starting position.

28. In boring machines and the like, a machine frame, a work support reciprocably mounted on said frame, a head frame reciprocably mounted upon said machine frame and adapted for movement in a direction transverse to the movement of the work support, a rotary tool driving spindle on said head frame, power means on said head frame for driving said spindle, a hydraulic actuator for imparting movement to said head frame whereby to cause a tool carried thereby to be moved into and out of operative association with a supported work piece, a reciprocable actuator means including a cylinder and piston construction for moving said work support in opposite directions, means for effecting the successive interruption of the movement of the work support as said support is moved in a given direction, the actuator associated with the work support cooperating with said interrupting means to locate said work support in preselected positions relative to a supported tool, fluid pumping mechanism, means carried by the work support for securing a work piece in position thereon, and valve means automatically operable for controlling the delivery of fluid to said actuators.

29. In boring machines and the like, a machine frame, a work support reciprocably mounted on said frame, a head frame reciprocably mounted upon said machine frame and adapted for movement in a direction transverse to the movement of the work support, a rotary tool driving spindle on said head frame, power means on said head frame for driving said spindle, a hydraulic actuator for imparting movement to said head frame whereby to cause a tool carried thereby to be moved into and out of operative association with a supported work piece, a reciprocable hydraulic actuator for moving said work support in opposite directions, shiftable abutment means for effecting the successive interruption of the movement of the work support as said support is moved in a given direction, the hydraulic actuator associated with the work support cooperating with said interrupting means to locate said work support in preselected positions relative to a supported tool, fluid pumping mechanism, means carried by the work support for securing a work piece in position thereon, and valve means automatically operable for controlling the delivery of fluid to said actuators.

30. In boring machines and the like, a linearly reciprocable work support, a tool support reciprocable transversely with respect to the movement of said work support, means for effecting the reciprocation of said tool support, means for automatically controlling the speed of travel of said tool support, said means being adapted to effect rapid traverse of said tool support during a predetermined interval and a slower traverse during another interval, reversible actuating means operable progressively and intermittently in a given direction for imparting step-by-step movement of said work support in a given direction in timed relation with respect to the movement of said tool support and for returning said work support upon the completion of the step-by-step movement thereof, shiftable abutment means for preventing the overrunning of the work support and cooperating with said reversible actuating means in effecting the step-by-step movement of the work support, and means on said work support for securing a work piece in position to be machined.

31. In metal working apparatus, a reciprocable carriage for supporting and positioning a work piece, a tool support reciprocable transversely with respect to the movement of said carirage, means for effecting the shifting of said tool support, means for controlling the speed of travel of said tool support in timed relation with the movement of said carriage, reversible actuating means operable progressively and intermittently in a given direction for imparting step-by-step movement to said carriage in a given direction in timed relation with respect to the movement of said tool support and for returning said carriage upon the completion of said step-by-step movement, means on the work support for properly locating a work piece in position to be acted upon by a supported tool, abutment means for preventing the overrunning of the carriage and cooperating with said reversible actuating means in effecting said step-by-step movement, and a single manually operable mechanism for controlling the movements of said carriage and tool support.

32. In metal working apparatus, a reciprocable carriage for supporting and positioning a work piece, a tool support reciprocable transversely with respect to the moven.ent of said carriage, means for effecting the shifting of said tool support, means for controlling the speed of travel of said tool support in timed relation with the movement of said carriage, reversible actuating means operable progressively and intermittently in a given direction for imparting step-by-step movement to said carriage in a given direction in timed relation with respect to the movement of said tool support and for returning said carriage upon the completion of said step-by-step movement, means on the work support for properly locating a work piece in position to be acted upon by a supported tool, abutment means for preventing the overrunning of the carriage and cooperating with said reversible actuating means in effecting said step-by-step movement, and means for preventing the shifting of the carriage until the tool support has withdrawn the tool supported thereby from the work.

33. In boring machines and the like, a machine frame, a work support reciprocably mounted on said frame, a head frame reciprocably mounted upon said machine frame and adapted for movement in a direction transverse to the movement of the work support, a rotary tool driving spindle on said head frame, power means on said head frame for driving said spindle, a hydraulic actuator for imparting movement to said head frame whereby to cause a tool carried thereby to be moved into and out of operative association with a supported work piece, a reciprocable hydraulic actuator for moving said work support in opposite directions, means for effecting the successive interruption of the movement of the work support as said support is moved in a given direction, the hydraulic actuator associated with the work support cooperating with said interrupting means to locate said work support in preselected positions relative to a supported tool, fluid pumping mechanism, means carried by the work support for securing a work piece in position thereon, valve means automatically operable for controlling the delivery of fluid to said actuators, and means for preventing reciprocation of said head frame during the reversal of said work support.

34. In metal working apparatus, a support for supporting and positioning a work piece, a rotary tool, a support for said rotary tool operatively associated therewith, one of said supports being linearly movable in parallelism with the axis of said supported tool and the other being linearly movable transversely of said tool axis, reversible actuating means operable progressively and intermittently in a given direction for imparting intermittent forward movement and reverse movement to said transversely movable support in timed relation with respect to the movement of the other support, means for automatically controlling the speed of relative axial movement between said tool and work supports, abutment means for preventing the overrunning of the transversely movable support and cooperating with said reversible actuating means in effecting the intermittent movement of said transversely movable support, and means for retaining a work piece in position upon said work support.

35. In metal working apparatus, a support for supporting and positioning a work piece, a rotary tool, a support for said rotary tool operatively associated therewith, one of said supports being linearly movable in parallelism with the axis of said supported tool and the other being linearly movable transversely of said tool axis, reversible actuating means including a cylinder and piston construction operable progressively and intermittently in a given direction for imparting intermittent forward movement and reverse movement to said transversely movable support in timed relation with respect to the movement of the other support, means for automatically controlling the speed of relative axial movement between said tool and work supports, abutment means for preventing the overrunning of the transversely movable support and cooperating with said reversible actuating means in effecting the intermittent movement of said transversely movable support, and means for retaining a work piece in position upon said work support.

JOHN S. BARNES.
PAUL R. GUIRL.

DISCLAIMER 2,020,868.—*John S. Barnes* and *Paul R. Guirl*, Rockford, Ill. BORING MACHINE AND THE LIKE. Patent dated November 12, 1935. Disclaimer filed September 24, 1943, by the assignee, *Odin Corporation*.

Hereby enters this disclaimer to claims 1, 2, 7, 8, 9, 10, 11, 17, 19, 22, 23, 24, 25, 26, 27, 28, 29, 30, 31, 32, 33, 34, and 35..

[*Official Gazette November 9, 1943.*]

tion in timed relation with respect to the movement of said tool support and for returning said carriage upon the completion of said step-by-step movement, means on the work support for properly locating a work piece in position to be acted upon by a supported tool, abutment means for preventing the overrunning of the carriage and cooperating with said reversible actuating means in effecting said step-by-step movement, and means for preventing the shifting of the carriage until the tool support has withdrawn the tool supported thereby from the work.

33. In boring machines and the like, a machine frame, a work support reciprocably mounted on said frame, a head frame reciprocably mounted upon said machine frame and adapted for movement in a direction transverse to the movement of the work support, a rotary tool driving spindle on said head frame, power means on said head frame for driving said spindle, a hydraulic actuator for imparting movement to said head frame whereby to cause a tool carried thereby to be moved into and out of operative association with a supported work piece, a reciprocable hydraulic actuator for moving said work support in opposite directions, means for effecting the successive interruption of the movement of the work support as said support is moved in a given direction, the hydraulic actuator associated with the work support cooperating with said interrupting means to locate said work support in preselected positions relative to a supported tool, fluid pumping mechanism, means carried by the work support for securing a work piece in position thereon, valve means automatically operable for controlling the delivery of fluid to said actuators, and means for preventing reciprocation of said head frame during the reversal of said work support.

34. In metal working apparatus, a support for supporting and positioning a work piece, a rotary tool, a support for said rotary tool operatively associated therewith, one of said supports being linearly movable in parallelism with the axis of said supported tool and the other being linearly movable transversely of said tool axis, reversible actuating means operable progressively and intermittently in a given direction for imparting intermittent forward movement and reverse movement to said transversely movable support in timed relation with respect to the movement of the other support, means for automatically controlling the speed of relative axial movement between said tool and work supports, abutment means for preventing the overrunning of the transversely movable support and cooperating with said reversible actuating means in effecting the intermittent movement of said transversely movable support, and means for retaining a work piece in position upon said work support.

35. In metal working apparatus, a support for supporting and positioning a work piece, a rotary tool, a support for said rotary tool operatively associated therewith, one of said supports being linearly movable in parallelism with the axis of said supported tool and the other being linearly movable transversely of said tool axis, reversible actuating means including a cylinder and piston construction operable progressively and intermittently in a given direction for imparting intermittent forward movement and reverse movement to said transversely movable support in timed relation with respect to the movement of the other support, means for automatically controlling the speed of relative axial movement between said tool and work supports, abutment means for preventing the overrunning of the transversely movable support and cooperating with said reversible actuating means in effecting the intermittent movement of said transversely movable support, and means for retaining a work piece in position upon said work support.

JOHN S. BARNES.
PAUL R. GUIRL.

DISCLAIMER 2,020,868.—*John S. Barnes* and *Paul R. Guirl*, Rockford, Ill. BORING MACHINE AND THE LIKE. Patent dated November 12, 1935. Disclaimer filed September 24, 1943, by the assignee, *Odin Corporation*.

Hereby enters this disclaimer to claims 1, 2, 7, 8, 9, 10, 11, 17, 19, 22, 23, 24, 25, 26, 27, 28, 29, 30, 31, 32, 33, 34, and 35..

[*Official Gazette November 9, 1943.*]